Patented Sept. 20, 1938

2,131,006

UNITED STATES PATENT OFFICE 2,131,006

TREATMENT OF ORES

Reginald S. Dean, Washington, D. C., assignor, by mesne assignments, to Chicago Development Company, Chicago, Ill.

No Drawing. Application January 8, 1936, Serial No. 58,111

12 Claims. (Cl. 75—3)

My invention relates to the treatment of oxide ores and particularly iron containing ores and has particular connection with the treatment of such ores to facilitate the reduction thereof for the recovery of the metal from its ores.

In the prior art processes of reducing ores by means of reducing gases, as exemplified in blast furnace practice in conjunction with iron ore treatment, it has been necessary to strike a compromise between coarse and impervious pieces of ore, sinter or briquettes, which permit a free flow of gas through bodies thereof but which are slowly reduced, and fine ores which, while quite rapidly reduced when in actual contact with the reducing gas or gases, greatly retard the flow of gas through any shaft or tube charged with the ore.

According to my present invention it is no longer necessary to resort to such a compromise since the fine ore is first formed into strong masses or glomerules which keep the ore column open for the free passage of the reducing gas and at the same time, due to their porosity, are rapidly reduced.

In general, I bring about this desirable result by forming the ores into porous masses or glomerules which are then subjected to elevated temperatures to impart strength and coherence to said masses or glomerules.

It is accordingly an object of my invention to treat oxide ores and particularly iron-containing ores to facilitate the reduction thereof.

Another object of my invention is to form oxide ore fines and particularly iron ore fines into porous masses or glomerules which possess sufficient strength so that they do not disintegrate during subsequent processing or treatment thereof.

Further objects of my invention will appear and become apparent in the light of the following description of a preferred manner of carrying out my invention.

Twenty to twenty-five pounds of fine particles of iron ore such as magnetite or hematite are placed in a drum which is rotated at a speed of approximately 12 R. P. M. while a small stream of water is moved about on the surface of the charge. In this way, the wet portions of the ore are rolled rapidly under the dry material until enough water has been added to cause the entire charge to form into balls or glomerules. The rate at which the water is added as well as the amount of water affects the size of the glomerules.

The ease with which various ores form balls or glomerules varies and is governed, among other things, by the amount of water used and the screen analysis of the ore. These factors may be suitably controlled so that the desired results are obtained. The following table shows the screen analyses which I have found satisfactory when using three different iron ores.

| Ore | −100 mesh | −100+200 mesh | −200 mesh |
|---|---|---|---|
| Limonite | 25.1 | 37.3 | 37.3 |
| Hematite | 15.6 | 19.6 | 64.5 |
| Magnetite concentrate | 42.7 | 22.0 | 35.3 |

In the case of ferberite, which is an iron-tungsten ore, I have obtained excellent results in glomerule formation with −200 mesh size material. Other ores may require somewhat varying technique but I have found that all oxide ores with which I have worked may be formed into glomerules by following the method which I have described above.

Aside from the method just described, other methods of forming the ores into masses or glomerules may be employed as, for example, is disclosed in United States Patents Nos. 1,673,891 and 1,789,895. I lay no claim to invention in my preferred method of forming the masses or glomerules and any method known in the art may be employed.

Reverting to my process, the glomerules, which are formed by the tumbling operation described, when wet possess a fair degree of mechanical strength but, when dry, they become friable and tend to disintegrate quite readily and possess substantially no mechanical strength. I have found, however, if the glomerules are heated to elevated temperatures they acquire a considerable degree of mechanical strength with no or little apparent loss of their porosity characteristics. In accordance with my method, therefore, I preliminarily dry the glomerules in any suitable way, for example, in the open air, to render them form retaining and then, without being subjected to breaking stresses, they are heated to a temperature ranging from approximately 500° C. to 1200° C. whereupon the glomerules acquire great strength without apparent loss of porosity. The temperature of heating depends upon the character of the ore and the strength desired. In general, the higher the heating temperature, the greater the strengh of the glomerules without adversely affecting the porosity until the melting range is reached. The melting range, therefore, marks the upper limit while the lower limit for most ores is in the neighborhood of about 500° C. If a considerable degree of strength is required, a temperature of approximately 1000° C. will be satisfactory for most ores with which I have worked.

I have found that most natural ores contain sufficient acid and basic oxides to form a strong bond on heating, but where the ore is of unusual purity, I add either an acid or basic oxide in a very small amount so that bonding will take place at a temperature of about 1000° C. or the particular temperature at which it is desired to operate.

For example, on very pure iron ores obtained by magnetic concentration I have found it desirable to add from ¼–½ of 1% of finely ground silica or more conveniently, Portland cement. The cement is not added for its setting properties although these may be advantageous but as a flux which, being very fine, can be uniformly distributed. Clay may also be used. In the case of an acid oxide like titanium or aluminum oxide a fraction of 1% lime may be added. Portland cement being both acid and basic may also be used with acid oxides. Manganese oxide is also an excellent basic oxide for bonding titanium and aluminum oxides and gives a strong bond at a somewhat lower temperature. For neutral oxides, like chromite I have found finely divided metallic iron an ideal binder. Powdered sponge iron in amount less than ½ of 1% is usually sufficient.

Glomerules prepared in accordance with my invention as described above are readily reduced by gaseous reducing agents. For example, half inch glomerules made in accordance with my invention were completely reduced in hydrogen at 950° C. for sixty minutes whereas commercial sinters were only 75% reduced and half inch pieces of magnetite were only 89.6% reduced under the same conditions. The only ores, of which I am aware, whose rate of reduction compared with the glomerules of my invention were limonites which become porous on heating but did not retain their strength.

The product of glomerule reduction is a compact, non-dusting mass even when composed of such high melting point materials as ferrotungsten made by reducing ferberite glomerules in hydrogen at 1050° C.

While the most important use of my invention is in connection with reducing oxides it may also be used where ores are to be reacted with other than reducing gases. For example, in the dry chlorination of chromite ores to separate the iron and chromium, glomerules of chromite prepared in accordance with my invention have been advantageously used.

While I have described my process in conjunction with iron-containing ores, it is evident that it can be adapted to other types of ores. In general, I have found that all oxide ores with which I have worked may be satisfactorily treated in accordance with my present invention. I have obtained particularly good results with the following ores: ilmenite, chromite, rutile, bauxite, ferberite, wolframite, pyrolusite, psilomelene, hematite, limonite, magnetite, rhodocrosite, zincite, and franklinite.

Having fully described my invention, what I claim as new and desire to protect by Letters Patent of the United States is:

1. The method of preparing oxide ores for reduction which comprises forming non-carbonaceous, non-molded glomerules of finely divided oxide ores and heating said glomerules, without being subjected to breaking stresses, to a temperature of between approximately 500° C. and the melting range of the ore to produce hard, porous, non-fused, welded masses having considerable mechanical strength.

2. The method of claim 1 wherein the ores are iron ores.

3. The method of preparing oxide ores for reduction which comprises mixing water with the finely divided ore to produce non-molded glomerules, drying said glomerules and heating the dried glomerules, without being subjected to breaking stresses, to a temperature of between approximately 500° C. and the melting range of the ore to produce, hard, porous, non-fused, welded masses having considerable mechanical strength.

4. The method of claim 3 wherein the ores are iron ores.

5. The method of preparing ores of the class consisting of hematite, magnetite, ferberite, chromite, bauxite, pyrolusite and franklinite, which comprises forming non-carbonaceous, non-molded glomerules of finely divided oxide ores and heating said glomerules, without being subjected to breaking stresses, to a temperature of between approximately 500° C. and the melting range of the ore to produce hard, porous, non-fused, welded masses having considerable mechanical strength.

6. The method of preparing ores of the class consisting of hematite, magnetite, ferberite, chromite, bauxite, pyrolusite, and franklinite, which comprises mixing water with the finely divided ore to produce non-molded glomerules, drying said glomerules and heating the dried glomerules, without being subjected to breaking stresses, to a temperature of between approximately 500° C. and the melting range of the ore to produce hard, porous, non-fused, welded, masses having considerable mechanical strength.

7. As a new article of manufacture, a non-molded glomerule consisting of fine particles of oxide ores agglomerated by means of a non-carbonaceous binder to produce a compact, non-dusting porous body possessing high mechanical strength and resistance to breakage and resulting from a heat treatment, in the absence of breaking stresses, of at least approximately 500° C., the ore particles being welded together at their points of contact without fusion.

8. As a new article of manufacture, a non-molded glomerule consisting of fine particles of iron containing ores agglomerated by means of a non-carbonaceous binder to produce a compact, non-dusting porous body possessing high mechanical strength and resistance to breakage resulting from a heat treatment, in the absence of breaking stresses, of at least approximately 500° C., the ore particles being welded together at their points of contact without fusion.

9. As a new article of manufacture, a non-molded glomerule consisting of fine particles of ores of the class consisting of hematite, magnetite, ferberite, chromite, bauxite, pyrolusite, and franklinite, agglomerated by means of a non-carbonaceous binder to produce a compact, non-dusting porous body possessing high mechanical strength and resistance to breakage resulting from a heat treatment, in the absence of breaking stresses, of at least approximately 500° C., the ore particles being welded together at their points of contact without fusion.

10. The method of preparing oxide ores for gaseous reduction which comprises forming non-carbonaceous, non-molded glomerules of finely divided oxide ores and heating said glomerules, without being subjected to breaking stresses, to a temperature of between 500° C. and the melting range of the ore to produce hard, porous, non-fused, welded masses having considerable mechanical strength.

11. In the method of treating oxide ores for chlorination, the steps which comprise forming non-carbonaceous, non-molded glomerules of finely divided oxide ores and heating said glomerules, without being subjected to breaking stresses, to a temperature of between 500° C. and the melting range of the ore to produce hard, porous, non-fused, welded masses having considerable mechanical strength.

12. The method of preparing chromite for chlorination which comprises mixing water with the finely divided ore to produce non-molded glomerules, drying said glomerules and heating the dried glomerules, without being subjected to breaking stresses, to a temperature of between approximately 500° C. and the melting range of the ore to produce hard, porous, non-fused, welded, masses having considerable mechanical strength.

REGINALD S. DEAN.